UNITED STATES PATENT OFFICE.

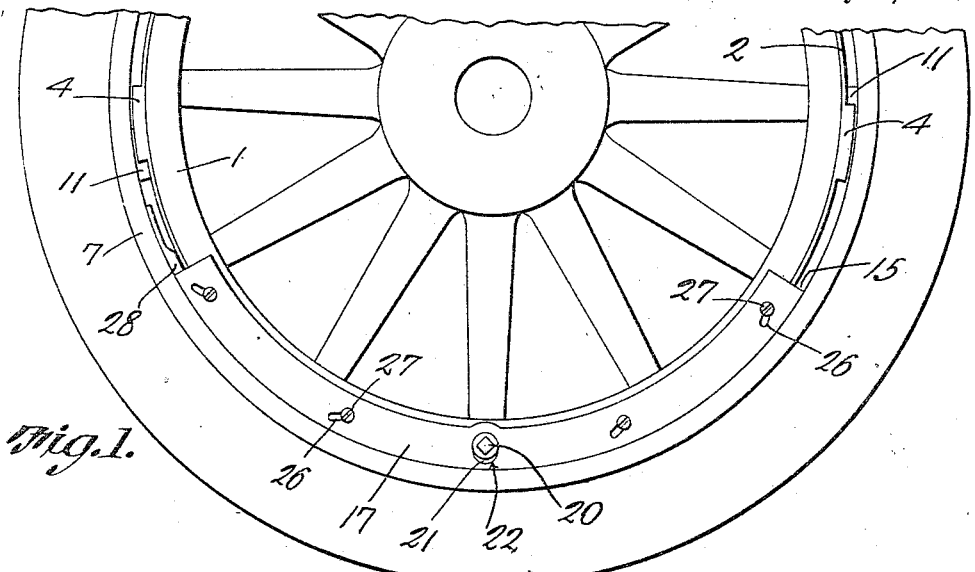

CLARENCE S. JOHNSTON, OF GLENDIVE, MONTANA.

DEMOUNTABLE RIM.

1,265,787.

Specification of Letters Patent.

Patented May 14, 1918.

Application filed May 12, 1917. Serial No. 168,228.

*To all whom it may concern:*

Be it known that I, CLARENCE S. JOHNSTON, a citizen of the United States, residing at Glendive, in the county of Dawson and State of Montana, have invented a new and useful Demountable Rim, of which the following is a specification.

It is the object of this invention to provide novel means whereby a demountable rim may be held upon a wheel body.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 is a side elevation, showing a part of a wheel equipped with the device forming the subject matter of this application;

Fig. 2 is a transverse section of the structure shown in Fig. 1;

Fig. 3 is a top plan of the felly band, portions of the rim appearing in section; and Fig. 4 is a fragmental longitudinal section showing a portion of the rim.

In the drawings, there is shown a wheel body comprising a felly 1 circumscribed by a felly band 2 provided at one side with a flange 3. The felly band 2 is supplied with outwardly extended radial projections 4, portions of the inner edges of which are inclined as shown at 5. A rim 6 is adapted to be slid transversely of the felly band 2 and is provided with any suitable means indicated at 7 for retaining a tire 8. The felly band 2 and the felly 1 are supplied with elongated openings 14 in which the valve stem (not shown) of the tire 8 is adapted to move, when relative circumferential movement takes place between the felly band 2 and the rim 6. The rim 6 may be divided as shown at 9, and any suitable latch means 10 may be provided for holding the ends of the rim detachably together. Since any suitable means may be provided for connecting the ends of the rim 6, and since a latch mechanism of any kind is a separate invention from the one herein claimed, the latch means need not be described in detail. The rim 6 is provided with inwardly extended radial projections 11 having inclined faces 12 coöperating with the inclined faces 5 of the projections 4 when relative circumferential movement takes place between the rim 6 and the felly band 2. Extended part way around the rim 6 and located adjacent one edge thereof is a rib 15, the exterior face of which is inclined as shown at 16, toward the median plane of the wheel. A locking member 17, preferably in the form of a segmental plate is slidable along one edge of the felly 1. At its outer edge, the locking member 17 is provided with an inclined surface 18 coacting with the inclined surface 16 of the rib 15 on the rim 6. A shaft 19 is journaled for rocking movement in the felly 1 and is held against longitudinal movement therein. At one end, the shaft 19 has a squared turning head 20. The shaft 19 carries an eccentric 21 movable in an opening 22 in the locking member 17. The shaft 19 is provided, also, with an eccentric 23, passing through an opening 24 in the felly 1 and passing through an opening 25 in the felly band 2. The eccentric 23 is adapted to bear against the under surface of the rim 6. The locking member 17 is provided with slots 26 which are inclined circumferentially of the wheel. Headed securing members 27, constituting guiding elements, pass through the slots 26 and enter the felly 1, the securing members 27 constituting means for holding the locking member 17 on one lateral edge of the felly 1 for movement both radially of the felly and circumferentially of the felly.

In practical operation, the rim 6 carrying the tire 8 is slid transversely onto the felly band 2 until one of the flanges 7 of the rim 6 abuts against the flange 3 on the felly band. Then, circumferential movement is imparted to the rim 6, and the projections 4 and 11 interlock, the inclined faces 5 and 12 of the respective projections coacting in wedging relation, and serving to force one of the flanges 7 against the flange 3. The shaft 19 then is rotated, by means of a wrench applied to the head 20, the eccentric 21 moving the locking member 17 outwardly, and the inclined surface 18 of the locking member coacting with the inclined surface 16 of the rib 15 on the rim 6, to crowd the rim transversely of the wheel. The locking member 17, being overlapped on the rib 15 as shown in Fig. 2, serves to aid in holding the rim 6 against transverse movement. When the locking member 17 is moved outwardly by the action of the cam 21, the slots 26, coacting with the securing elements 27, impart a longitudinal circumferential movement to the locking member 17, and the locking member 17 abuts at one end against a projection 28 on the rim 6, a circumferential movement of the rim with respect to the felly band 2 being prevented, and the projections 4 and 11 being held in engagement, as shown in Fig. 3. When the shaft 19 is rotated, the cam 23 bears against the rim 6 and aids in holding the rim in place.

It is to be observed especially that the locking plate 17 abuts against the projection 28 on the rim 6. Consequently, the rim 6 cannot move circumferentially, and because the rim 6 cannot move circumferentially, the elements 11 and 4 cannot disengage. The plate 17, further, engages with the rib 15, and the rim 6 is held against lateral movement, independently of the engagement between the elements 4 and 11. The invention aims to provide, in a simple structure, a plurality of coacting parts rendering it practically impossible for the wheel rim 6 to become loose, the construction being such that if, for any reason, one of the holding mechanisms becomes inoperative, others of the holding mechanisms will exercise their functions. Ordinarily, but one of the plates 17 is necessary, since this plate abuts against the projection 28 and maintains the parts 4 and 11 interlocked, against relative circumferential movement, but if desired, the element 17 and parts which coöperate therewith may be duplicated.

Having thus described the invention, what is claimed is:—

1. In a device of the class described, a wheel body having outwardly extended projections; a rim surrounding the wheel body and having inwardly extended projections locked behind the projections on the wheel body when the rim is moved circumferentially with respect to the wheel body, the rim having a longitudinal rib; a locking member mounted on the wheel body for inward and outward movement and coacting with the rib to prevent lateral movement of the rim in one direction; and means mounted on the wheel body for actuating the locking member.

2. In a device of the class described, a wheel body having outwardly extended projections; a rim surrounding the wheel body and having inwardly extended projections locked behind the projections on the wheel body when the rim is moved circumferentially with respect to the wheel body; the rim having a longitudinal rib, and being provided with a stop projection; a locking member; means for mounting the locking member on the wheel body for movement circumferentially of the wheel body to engage terminally with the stop projection, and for movement radially of the wheel body to coöperate with the rib; and means mounted on the wheel body for actuating the locking member.

3. In a device of the class described, a felly structure having outwardly extended projections; a rim surrounding the wheel body and provided with inwardly extended projections locked behind the projections on the wheel body when the rim is moved circumferentially with respect to the wheel body, the rim having a longitudinal rib and being provided with a stop projection; a locking member; means for mounting the locking member on the wheel body for movement radially of the wheel body and for movement circumferentially of the wheel body; a shaft journaled in the wheel body, and provided with eccentrics, one of which engages the rim, the other of which is engaged with the locking member to move the locking member radially and circumferentially, thereby to cause the locking member to coact with the rib and to engage terminally with the stop projection.

In testimony that I claim the foregoing as my own, I have hereto affixed my signature in the presence of two witnesses.

CLARENCE S. JOHNSTON.

Witnesses:
F. H. RAVAT,
P. L. HAGAN.